(12) United States Patent
Gates et al.

(10) Patent No.: US 11,582,300 B2
(45) Date of Patent: Feb. 14, 2023

(54) STREAMING SYNCHRONIZED MEDIA CONTENT TO SEPARATE DEVICES

(71) Applicant: Roku, Inc., San Jose, CA (US)

(72) Inventors: Gregory S. Gates, Saratoga, CA (US); Michael Chin-Ming Fu, Cupertino, CA (US)

(73) Assignee: ROKU, INC., San Jose, CA (US)

( * ) Notice: Subject to any disclaimer, the term of this patent is extended or adjusted under 35 U.S.C. 154(b) by 16 days.

(21) Appl. No.: 16/940,600

(22) Filed: Jul. 28, 2020

(65) Prior Publication Data

US 2020/0358849 A1 Nov. 12, 2020

Related U.S. Application Data

(63) Continuation of application No. 15/220,696, filed on Jul. 27, 2016, now Pat. No. 10,735,508.

(Continued)

(51) Int. Cl.
*H04L 67/1095* (2022.01)
*H04L 65/80* (2022.01)
(Continued)

(52) U.S. Cl.
CPC ........ *H04L 67/1095* (2013.01); *H04L 65/612* (2022.05); *H04L 65/764* (2022.05);
(Continued)

(58) Field of Classification Search
None
See application file for complete search history.

(56) References Cited

U.S. PATENT DOCUMENTS 6,122,668 A 9/2000 Teng et al.
8,015,306 B2 9/2011 Bowman
(Continued)

OTHER PUBLICATIONS

"Synchronize sound with video frames", Xpra.org But tracker and wiki website, Sep. 6, 2015 [retrieved on Apr. 23, 2022], Retrieved from the Internet: <URL: https://web.archive.org/web/20150906093709/https://xpra.org/trac/ticket/835>. (Year: 2015).*

(Continued)

*Primary Examiner* — Kevin T Bates
*Assistant Examiner* — Dae Kim
(74) *Attorney, Agent, or Firm* — Sterne, Kessler, Goldstein & Fox P.L.L.C.

(57) ABSTRACT

Described are system, apparatus, article of manufacture, method, or computer program product embodiments for controlling streaming of media content. An embodiment operates by halting a presentation of future content from a buffer upon determining that the buffer is exhausted of content to present. The embodiment includes receiving one or more packets over a network connection, the one or more packets including media information corresponding to a first portion of streaming media content, in which the first portion corresponds to a second portion of the streaming media content. The one or more packets in a buffer are stored as buffered content. Responsive to determining that the network connection is not experiencing a burst condition, the buffer is trimmed. Then, presentation of buffered content is resumed and the first portion is caused to be presented in sync with the second portion.

20 Claims, 7 Drawing Sheets

Related U.S. Application Data (60) Provisional application No. 62/317,870, filed on Apr. 4, 2016.

(51) Int. Cl.
*H04N 21/4363* (2011.01)
*H04N 21/43* (2011.01)
*H04L 65/612* (2022.01)
*H04L 65/75* (2022.01)
*H04L 65/61* (2022.01)
*H04L 65/65* (2022.01)

(52) U.S. Cl.
CPC ....... *H04L 65/80* (2013.01); *H04N 21/43076* (2020.08); *H04N 21/43635* (2013.01); *H04N 21/43637* (2013.01); *H04L 65/61* (2022.05); *H04L 65/65* (2022.05)

(56) References Cited

U.S. PATENT DOCUMENTS

| | | |
|---|---|---|
| 8,576,922 B2 | 11/2013 | Moss et al. |
| 8,631,455 B2 | 1/2014 | Park et al. |
| 8,997,169 B2 | 3/2015 | McCoy et al. |
| 10,735,508 B2 | 8/2020 | Gates et al. |
| 2003/0093267 A1 | 5/2003 | Leichtling et al. |
| 2006/0149850 A1 | 7/2006 | Bowman |
| 2008/0209482 A1 | 8/2008 | Meek et al. |
| 2008/0304573 A1 | 12/2008 | Moss et al. |
| 2009/0086987 A1* | 4/2009 | Wihardja ............ G10L 21/0208 381/71.1 |
| 2010/0290454 A1* | 11/2010 | Lundberg .............. H04J 3/0632 370/352 |
| 2011/0023076 A1 | 1/2011 | Park et al. |
| 2012/0200773 A1* | 8/2012 | Davis ................... H04N 21/631 348/515 |
| 2012/0246109 A1 | 9/2012 | Lahiri et al. |
| 2013/0251329 A1 | 9/2013 | McCoy et al. |
| 2014/0010515 A1 | 1/2014 | Lee et al. |
| 2014/0112156 A1 | 4/2014 | Wen |
| 2015/0296247 A1* | 10/2015 | Glasser .............. H04N 21/6587 725/74 |
| 2015/0319405 A1* | 11/2015 | Yarygin ................. H04N 21/40 386/203 |
| 2016/0234088 A1* | 8/2016 | Krüger .................... H04L 25/05 |
| 2017/0105038 A1 | 4/2017 | Subramanya et al. |
| 2017/0111233 A1 | 4/2017 | Kokkula et al. |

OTHER PUBLICATIONS

International Search Report and Written Opinion of the International Searching Authority for International Application No. PCT/US2017/025910, dated Jun. 15, 2017 (13 pages).

Shakkottai et al. 'A Study of Burstiness in TCP Flows', PAM 2005, LNCS 3431, pp. 13-26, 2005 [retrieved on Mar. 29, 2020], Retrieved from the Internet: <URL: http://www.ece.tamu.edu/-sshakkot/index_files/34310014.pdf> (Year: 2005).

\* cited by examiner

STREAMING SYNCHRONIZED MEDIA CONTENT TO SEPARATE DEVICES

CROSS-REFERENCE TO RELATED APPLICATIONS

This application is a continuation of U.S. patent application Ser. No. 15/220,696, filed Jul. 27, 2016, which claims the benefit of U.S. Provisional Patent Application No. 62/317,870, entitled "STREAMING SYNCHRONIZED MEDIA CONTENT TO SEPARATE DEVICES," filed on Apr. 4, 2016, all of which are incorporated by reference herein in their entireties.

BACKGROUND

Field

This disclosure is generally directed to streaming media content. More particularly, this disclosure relates to streaming synchronized media content to separate devices.

Background

Consumer electronics such as, for example, high-definition audio and video playback devices, can generally enable a user to watch or listen to their favorite media content by receiving or streaming the media content for playback on one of their devices. Playback of such content can occur, for example, on a television with built in speakers or through dedicated audio systems. But sometimes, for privacy reasons or to avoid disturbing other people, a user may want to listen to the audio of such content with headphones or earphones. For example, a user may wish to watch a video on a television while listening to the audio of that video through headphones. Although some audio systems or televisions may allow a user to plug in headphones, this can be unwieldy as a user may need to physically plug the headphones into the television or audio system resulting in long wires or may need specialized wireless headphones or other proprietary wireless devices. Thus, there is a need for allowing such headphone usage, while not forcing users to purchase additional or proprietary equipment.

Users typically carry mobile devices with them, and these mobile devices often have headphone jacks. Moreover, these devices also have the capability of receiving streaming media content, also referred to as streaming content. But, if a user wishes to listen to audio on a mobile device while watching video on a separate device, such as a television, synchronizing these multiple portions of media content across multiple devices presents several technical challenges. Humans are fairly sensitive to synchronization issues between the video and audio portions of streaming content. These problems worsen when the multiple devices communicate using consumer-grade wireless networking technologies and the multiple devices have proprietary operating systems.

Consumer-grade wireless networking technologies do not generally provide a suitable medium for streaming synchronized portions, e.g., audio and video portions, of media content to multiple devices. This problem can be attributed largely to the bursting behavior exhibited by consumer-grade routers, in which the routers will first fail to deliver media content in a timely and consistent manner, then queue the undelivered media content, and finally transmit the queued media content in bursts to the receiving devices. Under severe network congestion conditions, packets can also be lost as the router is unable to deliver a packet of audio data within the number of allotted tries. Techniques for streaming synchronized media to multiple devices frequently rely on communication media having low-latency and consistent delivery times, but bursting often renders these techniques unsuitable by both increasing network latency and disrupting consistent delivery of media.

Playback devices with proprietary operating systems introduce other challenges to delivering portions of a media content stream, also referred to as media stream, to disparate devices while maintaining synchronization of the streaming media content across the devices. As discussed above, streaming synchronized media content to multiple devices frequently relies on communication media having low-latency and consistent delivery times. Similarly, this streaming may also rely on devices to handle the content in a timely and consistent manner. But proprietary operating systems—such as, for example, those found in many consumer mobile devices—do not usually provide applications access to the lower-level systems to guarantee the timely receipt and processing of data that can be required in streaming applications. Thus, just as consumer wireless networking technologies provide management features that interfere with synchronized streaming of media content, proprietary operating systems often also provide management features that interfere with the receipt and processing of streaming media content by applications running on those operating systems.

Hence, delivering synchronized portions of media content to multiple devices presents technical challenges, particularly when using consumer-grade wireless networking technologies or devices with proprietary operating systems. Conventional media playback devices do not adequately address these challenges.

SUMMARY

Provided herein are system, apparatus, article of manufacture, method, or computer program product embodiments, or combinations and sub-combinations thereof, for controlling streaming of media content.

An embodiment includes a system for controlling streaming of media content. The system can include at least one processor and a memory coupled to the at least one processor and including a buffer that stores a first portion of streaming media content to be presented. The processor is configured to halt a presentation of future content from the buffer upon determining that the buffer is exhausted of content to present; receive one or more packets over a network connection, the one or more packets comprising media information corresponding to the first portion of streaming content, wherein the first portion corresponds to a second portion of the streaming content, store the one or more packets in the buffer as buffered content to be presented, determine that the network connection is not experiencing a burst condition, and in response to determining the network connection is not experiencing the burst condition, trim the buffered content such that a remaining buffered content corresponds to the second portion being presented, and resume a presentation of buffered content by causing the first portion to be presented in sync with the second portion being presented.

Further embodiments, features, and related advantages, as well as the structure and operation of the various embodiments are described in detail below with reference to accompanying drawings.

BRIEF DESCRIPTION OF THE FIGURES

The accompanying drawings are incorporated herein and form a part of the specification.

Like reference numerals refer to corresponding parts throughout the several views of the drawings. Additionally, generally, the left-most digit(s) of a reference number identifies the drawing in which the reference number first appears. Furthermore, unless explicitly stated otherwise, a complete set of elements can vary for a given feature, embodiment, or implementation even though the same designator can be used between various features, embodiments, or implementations.

DETAILED DESCRIPTION

Figure 1:
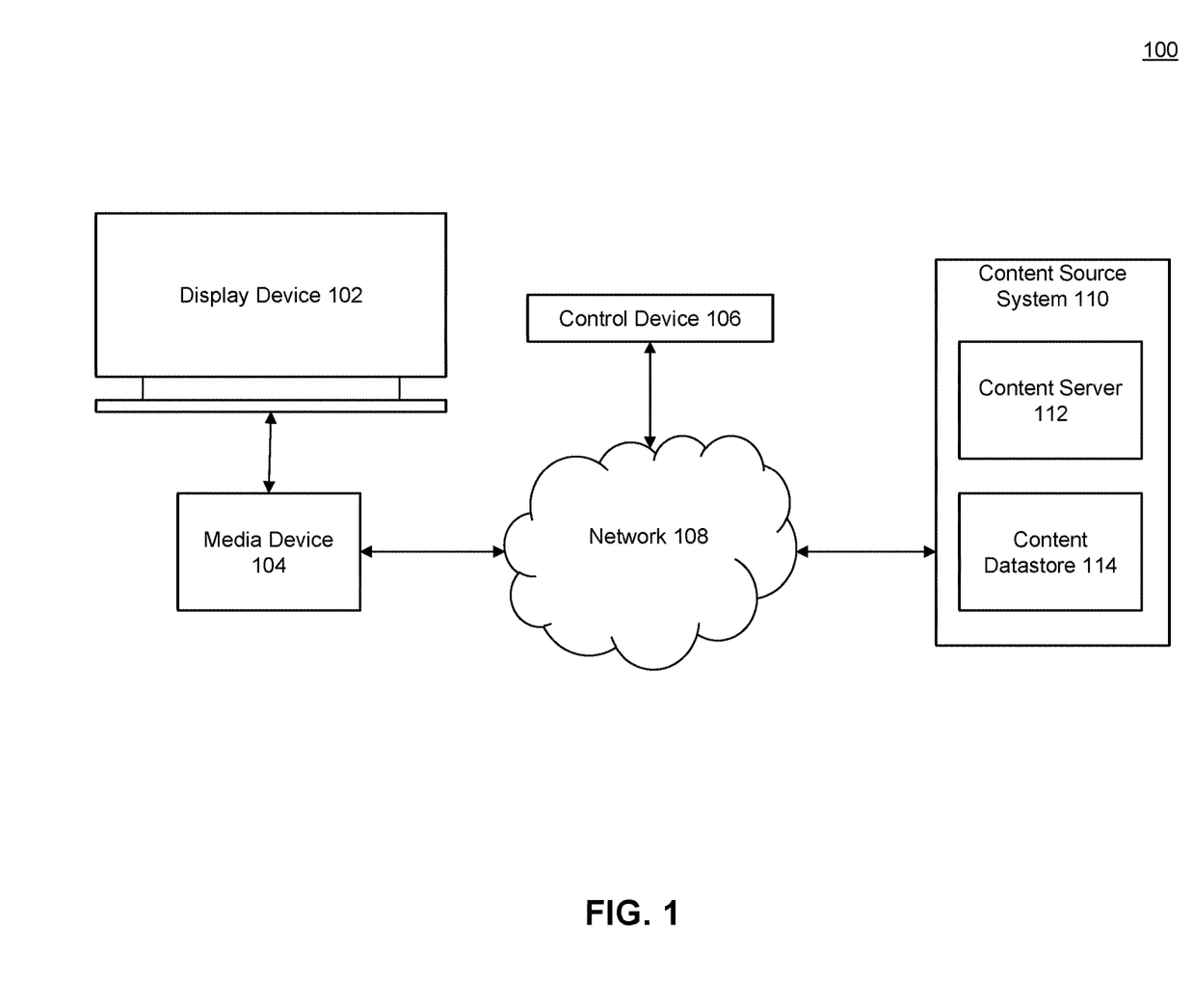
FIG. 1 illustrates a block diagram of a media control system configured according to an example embodiment.

FIG. 1 illustrates a block diagram of a media control system 100, according to an embodiment. In particular, media control system 100 can include a display device 102 (e.g. a monitor, television, a projector, etc.), a media device 104 (e.g. streaming devices, multimedia devices, audio/video playback devices, etc.), a control device 106 (e.g. a remote control, mobile device, phone, tablet, etc.), a network 108, a content source system 110, or any combination thereof. Although media control system 100 depicts a particular number and arrangement of elements, embodiments are not limited thereto and support any number or arrangement of display devices, media devices, control devices, networks, and content source systems.

In an embodiment, content source system 110 can include a content server 112 and an associated content datastore 114. Content server 112 can provide media device 104 with content, from content datastore 114 or any other source, for synchronized streaming to display device 102 and control device 106. The content provided to media device 104, such as content stored within content datastore 114, may be media content (or multimedia content) and include music, video, multimedia, still pictures, text, graphics, gaming applications, and the like. In an embodiment, the content may be provided in the form as a content stream or a media content stream. Further, the content can be requested by and provided to media device 104 through the network 108. In an embodiment, content source system 110 can similarly provide media content or a media content stream to control device 106 via network 108 or other networks, e.g., mobile networks, accessible by control device 106.

In an embodiment, media device 104 synchronously streams corresponding portions of media content to display device 102 and control device 106. For example, media device 104 can transmit a first portion of media content such as video content to display device 102 and transmit a second portion of media content such as audio content to control device 106 so that the video and audio content are presented simultaneously in sync. In an embodiment, to transmit the separate portions, media device 104 separates a media content into multiple portions, e.g., a first portion representing a video content and a second portion representing an audio content.

In an embodiment, the first portion of media content can be presented by display device 102 after a first delay time. The first delay time corresponds to the time period beginning when media device 104 transmits packets of the first portion of media content to display device 102 and ends when display device 102 presents the first portion of the media corresponding to the packets. This first delay time depends on the type of communication technology in use. For example, a first delay time may be 130 milliseconds (ms) when media device 104 transmits video content to display device 102 using High-Definition Multimedia Interface (HDMI). The first delay time can be an actual delay time, an average delay time, an expected delay time, or a value derived from any combination thereof.

In an embodiment, the second portion of media content can be presented by control device 106 after a second delay time. The second delay time corresponds to the time period beginning when media device 104 transmits packets of the second portion of media content to control device 106 and ends when control device 106 presents the second portion of the media corresponding to the packets. This second delay time can depend on the type of communication technology in use. For example, a second delay time may be 350 ms when media device 104 transmits audio content to control device 106 wirelessly via network 108. The second delay time can be an actual delay time, and average delay time, an expected delay time, or a value derived from any combination thereof. In some cases, the second delay time can be highly variable due to the bursting behavior of the consumer Wi-Fi network on a packet-to-packet basis as described above, for example.

The first and second delay times can differ, in part, because of the different types of communication technologies used to transmit the portions of media content for presentation. For example, whereas the second portion may be sent from media device 104 to control device 106 via consumer-grade routers using a Wi-Fi protocol, the first portion may be sent from media device 104 to display device 102 through cable using HDMI. In this example, the second delay time is typically much greater than the first delay time because the wireless technology used by the consumer-grade routers is slower than the HDMI cable technology.

In an embodiment, presentation of the first or second portions of media content is deliberately delayed to coordinate synchronized presentation with one or more other portions of media content. For example, if the first delay time is 130 ms and the second delay time is 350 ms, transmission of the first portion of media content can be delayed an additional 220 ms so that the first and second portions are presented simultaneously in sync across separate devices. In an embodiment, media device 104 controls this delayed transmission. In an embodiment, display device 102 receives an un-delayed transmission of the first portion and itself delays presentation of the first content by, e.g., the aforementioned 220 ms. In an embodiment, total amount of delay, which can be referred to as target sync time, is a first or second delay time. The total amount of delay may be other values such as the sum of the first and second delay time. In an embodiment, the total amount of delay includes an additional delay time, which is a small, incremental buffer time. This additional delay time is utilized to prevent the user from experiencing glitches in the video. For example, glitches may include video lag or stuttering video.

In an embodiment, the target sync time can be used by media device 104 and control device 106 to coordinate simultaneous presentation of synchronized portions of content. Media device 104 can transmit the first portion of media content after a time approximately equal to a difference between the target sync time and the first delay time. Control device 106 can prepare to present a buffered second portion of media content at a time approximately equal to the difference between the target sync time and the second delay time. In an embodiment, control device 106 implements a buffer to receive second portions of media content. Various types of buffers, such as a ring buffer, may be implemented. In an embodiment, the size of the buffer can be determined dynamically or statically.

In an embodiment, changing conditions of network 108 can affect control device 106's performance and ability to maintain enough buffered second portion of media content to be presented in sync with the first portion of media content (presented by, for example, display device 102) without exhausting the buffer. When the buffer is exhausted of available content to present, the buffer may experience a buffer underrun.

If bursting is present in the received second portion of the media content stream, resuming streaming immediately after rebuffering may not be desirable because it is likely that the buffer will be exhausted in the future given the ongoing bursting. Immediately presenting rebuffered content while undergoing bursting may be undesirable because it can lead to presenting both out-of-sync and stuttered content. For example, buffer underruns are frequently caused by long latencies between arrival of packets (whether successive packets or not), which exceed a playing time of the amount of data (such as audio data) stored in the buffer. When this buffer underrun occurs, the control device 106 does not have content to play from the buffer (e.g., playing silence instead of audio) while waiting for additional packets to arrive. When the packets finally do arrive, the packets burst and quickly fill, for example, an audio buffer. However, in an underrun situation where a buffer may have been previously exhausted, the earliest arriving audio packets (after the buffer underrun had occurred) correspond to video content that had already been presented by display device 102. So playback of the earliest arriving audio packets would result in out-of-sync video and audio. Even in the absence of bursting, network conditions and clock skew between devices, e.g., control device 106, media device 104, or display device 102, can lead to the first and second portions being presented out of sync.

This disclosure provides techniques for responding to these various conditions to keep the first and second portions being presented in sync. For example, this disclosure provides techniques for determining how to adjust buffered content and when to resume streaming the buffered content when faced with a buffer underrun condition occurring while bursting is present (see, e.g., the discussion of methods 300 and 400). As another example, this disclosure provides techniques for adjusting a target sync time based on changing conditions of network 108 (see, e.g., the discussion of method 500). In a further example, this disclosure provides techniques for maintaining the quality of service (QoS) between devices presenting corresponding portions of content in sync (see, e.g., the discussion of method 600).

In an embodiment, media device 104 can be integrated with, operatively coupled to, or connected to a respective display device 102, control device 106, or network 108. Media device 104 can be configured to communicate with its respective display device 102 and network 108. In various embodiments, network 108 can include, without limitation, a computer or telecommunications network, which can enable coupled or interconnected systems or devices to communicate information between and amongst each other. In an embodiment, the network 108 can include, without limitation, an intranet, an extranet, an Internet, a local area network (LAN), a wireless LAN (WLAN), one or more routers, one or more switches, one or more hubs, or any other local, regional, or global telecommunications network.

In an embodiment, the media device 104 can be configured to aurally or graphically present user interfaces or content on display device 102 or control device 106, including any acoustic transducers (e.g., speakers, etc.) operatively coupled to display device 102 or control device 106. For example, the media device 104 can be configured to acoustically, graphically, or visually present content on the display device 102 sourced from media device 104 or content source system 110.

In addition to or alternative to the above example, media device 104 can be configured to provide the one or more user interface (UI) views or UI elements and associated graphical or acoustic information to display device 102 or control device 106 for acoustical, graphical, or visual presentation. The UI views, UI elements, or associated acoustic information can be generated by content source systems 110 or the media device 104.

In an embodiment, media device 104 can be configured to provide synchronized streaming of media content to display device 102 and control device 106. For example, media device 104 can stream a video portion of media content to display device 102 and an audio portion of that media content to control device 106. Alternatively or additionally, media device 104 can be configured to provide one or more UI views or UI elements to display device 102 or control device 106. In an embodiment, media device 104 receives the media content from content source system 110 or control device 106. The media content received from control device 106 may be media content downloaded from content source system 110 to control device 106, or media content captured by control device 106. For example, captured media content may be video or audio content recorded by control device 106 or pictures taken by control device 106. In an embodiment, upon receiving the media content, media device 104 separates the media content stream into multiple portions for presenting by multiple devices such as display device 102 and control device 106.

In an embodiment, control device 106 can be configured to communicate user-input information with media device 104 and can optionally include a touch screen display (not shown) or audio input or output (I/O) circuitry. For example, control device 106 can be configured to use one or more wired or wireless communication protocols or standards, which can include, without limitation, infrared (IR) protocols or standards, radio frequency (RF) protocols or standards, or Bluetooth protocol or standard to communicate with media device 104, whether directly or via network 108. In an embodiment, control device 106 can be further configured to enable a consumer or user of a media device (e.g., media device 104) to navigate or make user selections from the UI views presented on a display device (e.g., display device 102).

Additionally or alternatively, control device 106 can be configured to present at least a portion of the UI views on a touch screen display (not shown) connected or integrated with control device 106 to enable a consumer or user of media device 104 to navigate, select, or otherwise interact with various content as previously discussed. Examples of control device 106 can include, without limitation, remote controls, mobile devices, phones, or tablets.

In an embodiment, control device 106 communicates with media device 104 to present, to a user, a portion of media content in sync with a corresponding portion of the media content presented on, for example, display device 102 as controlled by media device 104. Control device 106 may be configured to communicate with media device 104 via various communication protocols, such as Real-time Transport Protocol Control Protocol (RTCP). In an embodiment, control device 106 uses the communication protocol to transmit various types of messages indicating an operating status of control device.

In an embodiment, the portion of media content is an audio portion of the streaming media content. For example, control device 106 can present the audio through headphones connected to control device 106, an integrated or external speaker of control device 106, or any combination thereof. Control device 106 can begin streaming audio content when headphones or a speaker is connected at an interface. Alternatively, audio streaming can start in response to a user input, such as selection of a physical or simulated button press. Upon or throughout streaming, control device 106 may transmit a message to media device 104 indicating its status, i.e., currently streaming audio content. In an embodiment, if control device 106 does not periodically transmit a currently-streaming status, media device 104 halts transmission of audio content, which causes control device 106 to halt presenting buffered audio content.

In an embodiment, presentation of the audio content on control device 106 can be halted when the headphones or a speaker is disconnected from an interface of control device 106, at which point the audio portion can resume playing at the device playing the video portion. Alternatively, presentation of the audio stream at control device 106 can be halted in response to: a user input, the audio stream has been directed to another device, control device 106 is disconnected from network 108, or there is a network failure of network 108. In an embodiment, upon determining to halt streaming audio content, control device 106 transmits a message to media device 104 indicating its status, i.e., halting streaming of audio content.

Figure 5:
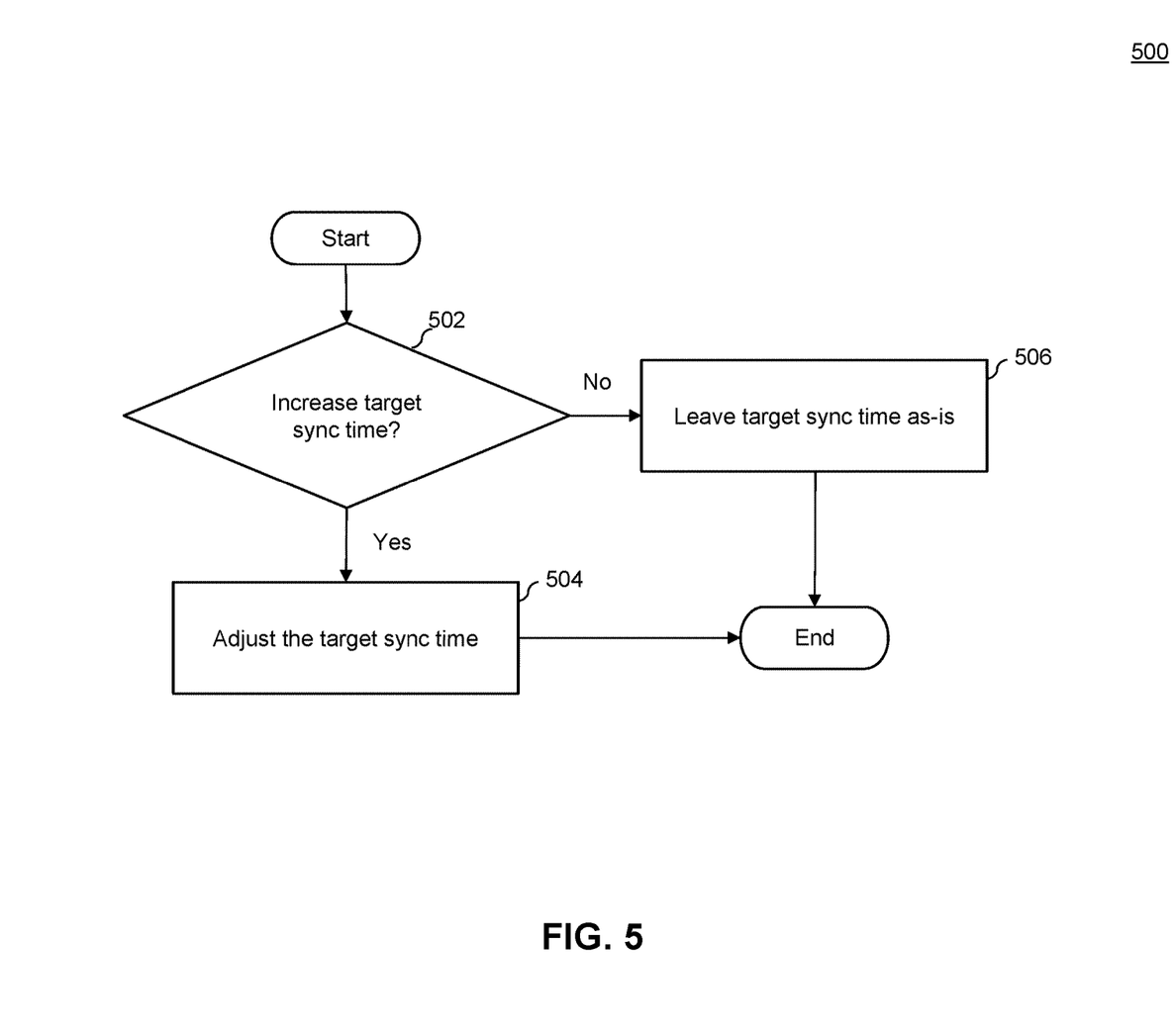
FIG. 5 illustrates a flowchart of an example method for managing a target sync time, in accordance with one or more embodiments.

In an embodiment, control device 106 can adjust the target sync time, as described with respect to FIG. 5. Adjusting the target sync time upwards may cause media device 104 to increase the delay before sending a first portion of media content to present on display device 102. As a result, control device 106 may have more time to receive the second portion of that media content, which may reduce the likelihood of buffer underruns. In an embodiment, to cause the media device 104 to use the adjusted target sync time, control device 106 transmits to media device 104 a message indicating its status, i.e., that it has adjusted the target sync time.

Although system 100 is discussed in the context of streaming a second portion of content to a single device, embodiments support streaming to any number of devices. For example, the second portion can be streamed using multicast or broadcast techniques to multiple devices. In such cases, the delay values corresponding to each of the streamed portions may differ due to the types of technology used to transmit streams, type of devices, location of devices, network conditions, etc. Thus, in an embodiment, the delay values may be separately calculated and adjusted for each device.

In an embodiment, multiple additional portions of content can be streamed to a single device, e.g., control device 106 or display device 102. For example, media content can include both an audio portion and audio sound effects, each of which can be transmitted as separate streams. The separate streams can be separately configured. For example, techniques for handling the separate streams can have different target sync times, burst thresholds, buffer sizes, packet types, protocols, or other configuration details.

Figure 2:
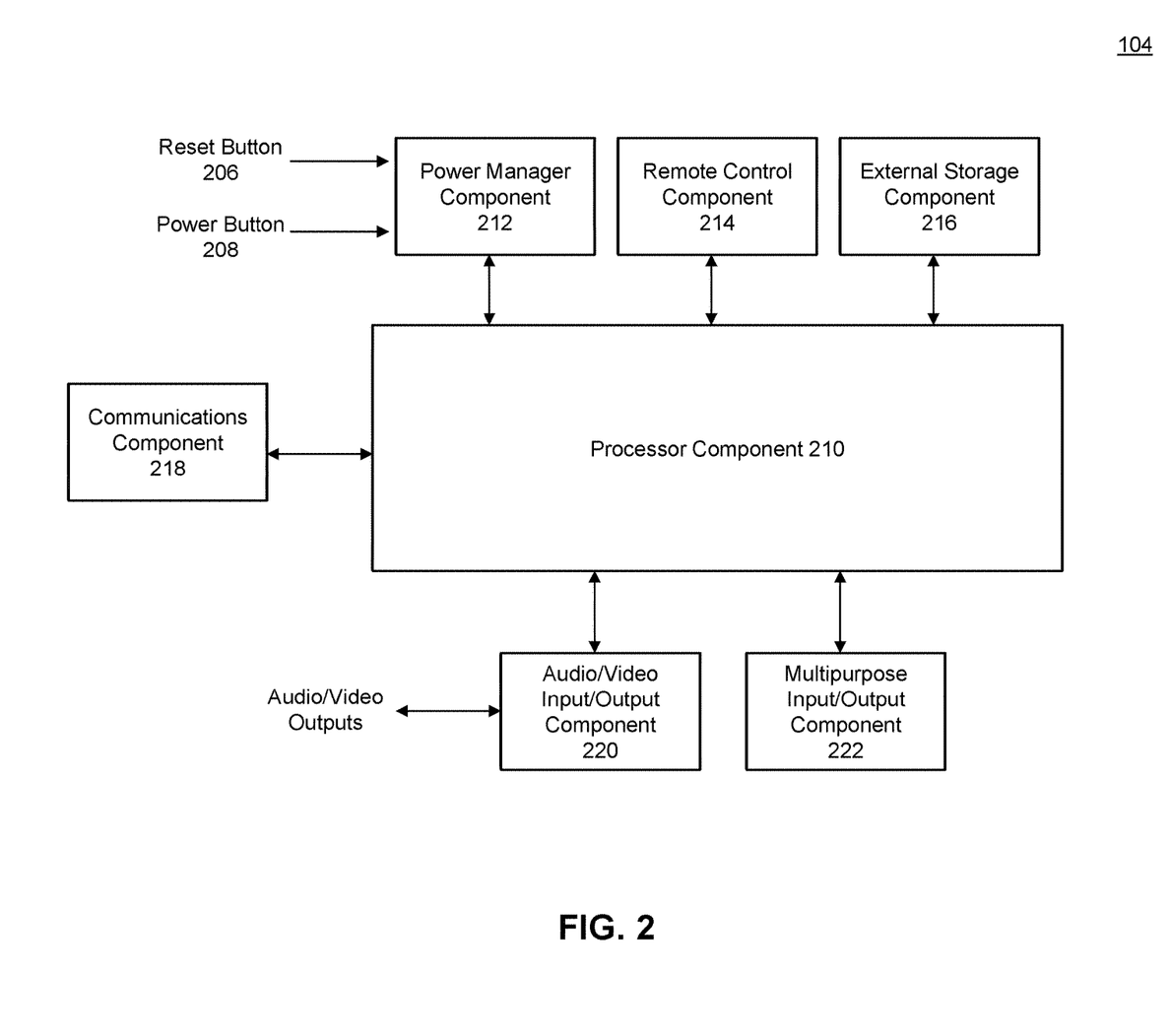
FIG. 2 illustrates a block diagram of an embodiment of a media device in an example embodiment.

FIG. 2 illustrates a block diagram of an embodiment of media device 104 in an example embodiment. Media device 104 can be configured to communicate with display device 102, control device 106, and content source system 110 via network 108 to provide requested content for auditory, graphical, or visual presentation on display device 102 or control device 106. Media device 104 can include, but is not limited to, processor component 210, communications component 218, audio/video (A/V) input/output (I/O) component 220, multipurpose input/output (I/O) component 222, power manager component 212, remote control component 214, and external storage component 216. Each of the components can be operatively connected or coupled to each other.

In an embodiment, the processor component 210 can be generally arranged to execute instruction information including one or more instructions. In an embodiment, the processor component 210 can be a low power processor component or system-on-chip (SoC) processor component which can comprise, among other elements, processor circuit, which can include, but is not limited to, at least one set of electronic circuits arranged to execute one or more instructions. Examples of processor components 210 can include, but are not limited to, Qualcomm® Snapdragon®, Nvidia® Tegra®, Intel® Atom®, Samsung® Exynos, Apple® A7®, Apple® A8®, or any other type of mobile processor(s) arranged to execute the instruction information including the one or more instructions stored in a memory.

In an embodiment, the communications component 218 can be generally arranged to enable media device 104 to communicate, directly or indirectly via network 108, with control device 106 or content source system 110. The communications component 218 can include, among other elements, a radio frequency circuit configured for encoding or decoding information and receiving or transmitting the encoded information as radio signals in frequencies consistent with one or more wireless communications standards (e.g., Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.). Additionally or alternatively, the communications component 218 can further include network interface circuit encoding or decoding information, and receive or transmit the encoded information as electrical or optical signals consistent with one or more wired or optical network standards (e.g., Ethernet, Fibre Channel, etc.).

In an embodiment, the power manager component 212 can be generally arranged to manage media device 104 in one or more power states and transition between the one or more power states. The one or more power states can include, without limitation, reset state, sleep state, power-on state, or power-off state. The power management component 212 can further be can also be operatively coupled to a power button 206 to transition media device 104 between powered on state, sleep state, or power-off state. The power management component 212 can also be operatively coupled to a reset button 208 to transition media device 104 to a reset state, which can be followed by the power on state.

In an embodiment, the remote control component 214 can be generally arranged to receive user-input information from and transmit streaming content to control device 106, directly or indirectly via network 108. The remote control component 214 can be configured to use one or more wireless communication protocols or standards, which can include, without limitation, infrared (IR) protocols or standards, radio frequency (RF) protocols or standards, or Bluetooth protocol or standard to communicate with control device 106.

In an embodiment, the external storage component 216 can be generally arranged to store information in volatile or nonvolatile memory. Additionally or alternatively, the external storage component 216 can be further operatively coupled to external storage components (not shown) such as, for example, USB memory, SSD, hard disk drives (HDD), secure digital (SD) nonvolatile memory, and the like. The stored information can include, without limitation, information from content source system 110, one or more components or operating systems stored in a memory, information generated by the one or more components or operating systems stored in a memory, content, or the like.

In an embodiment, the A/V I/O component 220 can be generally arranged to communicate audio or video information operatively coupled to one or more components or devices. For example, the A/V I/O component 220 can be configured to output audio information or video information to display device 102 or control device 106 for acoustic, auditory, graphical, or visual presentation on display device 102 or control device 106. Display device 102 can be operatively coupled or connected to the A/V I/O component 220 via one or more audio or video interfaces.

In an embodiment, the one or more audio or video interfaces can include, without limitation, high definition multimedia interface (HDMI), display port (DP), Red-Green-Blue (RGB) component video, Separate Video (S-video), Digital Visual Interface (DVI), Video Graphics Array (VGA), Mobile High-Definition Link (MHL), composite video, analog audio, or Sony®/Philips® Digital interface (S/PDIF) digital audio, USB, Apple® Thunderbolt®, and the like.

In an embodiment, the multipurpose I/O component 222 can be generally arranged to communicate with one or more external devices via one or more interfaces. The one or more interfaces can include, without limitation, wired (e.g., USB, or Apple® Thunderbolt®) or wireless (e.g., WiFi), and the like. The one or more external devices (not shown) can include, without limitation, keyboards, mice, cameras, microphone, and the like.

In an embodiment, the operating system can include, without limitation, embedded operating systems (e.g., Apple®, iOS®, Google® Android®, HP® WebOS®, Microsoft® Windows Embedded®, Microsoft® Windows®, Linux, etc.) general arranged to manage hardware resources (e.g., one or more components of media device 104) or software resources (e.g., one or more applications of media device 104).

In an embodiment, the input component can be generally arranged to interface with remote control component 214 or multipurpose I/O component 222 to receive user or consumer or process one or more commands including navigation commands or selection commands which can represent selection of content, search for content, or an ongoing interaction with an application.

In an embodiment, the output components can be generally arranged to generate audio or video information based on content received, buffered, stored, or streamed from content source system 110. Additionally, the output components can also be generally arranged to generate audio or video information based on content stored in a memory or memory operatively coupled to the external storage component 216. The output components can be further arranged to generate the audio or video information based on customized UI information representative of one or more UI views (not shown) including one or more UI elements received or generated by one or more components of a memory or operating system.

In an embodiment, the output components can be arranged to provide the generated audio or video information to a display device (e.g., display device 102) operatively coupled to the A/V I/O component 320 to (i) aurally or graphically present at least a portion of the generated audio or video information on the display device (e.g., display device 102) while (ii) aurally or graphically presenting at least another synchronized portion of the generated audio or video information on a control device (e.g., control device 106).

Figure 3:
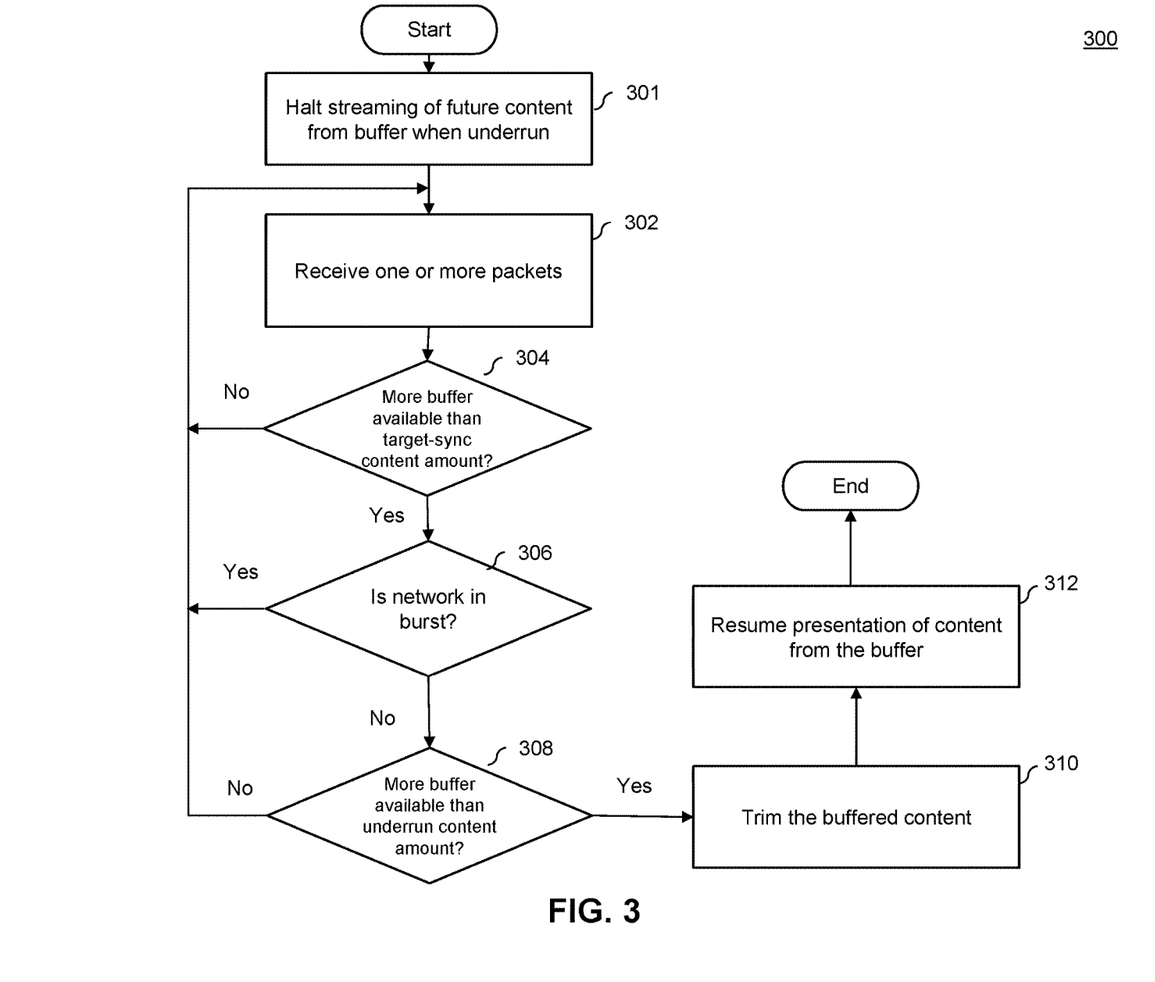
FIG. 3 illustrates a flowchart of an example method for managing a buffer to stream synchronized content, in accordance with one or more embodiments.

FIG. 3 is a flowchart of a method 300 for managing a buffer to stream synchronized content, according to an embodiment. Method 300 can be used when a content buffer is underrun to determine when (i) the buffer is sufficiently full to resume streaming and (ii) network conditions warrant resuming streaming. Method 300 can be performed by processing logic that can comprise hardware (e.g., circuitry, dedicated logic, programmable logic, microcode, etc.), software (e.g., instructions executing on a processing device), or a combination thereof. In an embodiment, method 300 is performed by control device 106, which can be implemented by a computer system such as computer system 700.

Method 300 starts and proceeds to block 301. At block 301, streaming of future content from the buffer may be halted upon determining that the buffer is exhausted of content to present. This exhausted buffer may represent an occurrence of a buffer underrun. In an embodiment, control device 106 performs the halting and determining. For example, control device 106 can halt presenting audio content.

At block 302, one or more packets of a portion of media content are received. In an embodiment, control device 106 receives the packets from media device 104 via network 108. The one or more packets can be any packet type, such as, for example, User Datagram Protocol (UDP) Real-time Transport Protocol (RTP) packets. The one or more packets within the portion can carry information corresponding to media content, such as, for example, audio content of streaming media. The one or more packets can be added to a buffer storing the portion of media content to be presented. In an embodiment, control device 106 implements the buffer for storing the one or more packets as buffered content to be presented by control device 106. In an embodiment, the portion of media content corresponds to a second portion of that media content presented by a separate device, such as, display device 102.

At block 304, whether more buffered content, which may be represented temporally, than target sync time is available is determined. This temporal representation may be the available streaming time or the amount of time needed to stream the buffered content. In an embodiment, control device 106 compares the temporal representation with the target sync time to make this determination. In an embodiment, control device 106 can make the determination by comparing the amount of buffered content with an amount of content needed to stream for the target sync time, referred to as target-sync content amount. In an embodiment, the buffer is implemented as a ring buffer. If control device 106 determines that more buffer is available than target-sync content amount or analogously, that the temporal representation of available buffer exceeds or matches the target sync time, method 300 proceeds to block 306. Otherwise, method 300 proceeds to block 302.

At block 306, whether the network is undergoing bursting is determined. In an embodiment, control device 106 determines whether bursting conditions are present. Control device 106 can determine that bursting conditions are present by monitoring the timing of receiving packets from network 108. In an embodiment, control device 106 determines bursting conditions are present using method 400, which is described below with respect to FIG. 4. If control device 106 determines bursting conditions are present, method 300 proceeds to block 302. Otherwise, method 300 proceeds to block 308.

At block 308, whether more buffered content, which may be represented temporally, than an underrun time is available is determined. This temporal representation may be the available streaming time or the amount of time needed to stream the buffered content. In an embodiment, control device 106 compares the temporal representation with the underrun time to make this determination. The underrun time refers to the amount of time during which no content was presented from the buffer. In an embodiment, content may not have been presented since the buffer was exhausted, i.e., the buffer had no content available to play, as described with respect to block 301. When more streaming time of buffered content, as indicated by the temporal representation, is available than the underrun time, this indicates that there is enough buffered content to present in sync with a corresponding portion of content presented by display device 102.

In an embodiment, to present the buffered content in sync, all data, e.g., received packets, from the buffer that should have been presented during the underrun time should be trimmed off the front of the buffer because no content was presented instead of data that arrived later during bursting.

In an embodiment, control device 106 can make the determination by comparing the amount of buffered content with an amount of content needed to stream for the underrun time, referred to as underrun content amount. If control device 106 determines that more buffer is available than the underrun content amount or analogously, that the temporal representation of available buffer exceeds or matches the underrun time, method 300 proceeds to block 310. Otherwise, method 300 proceeds to block 302.

At block 310, the buffered content is trimmed. In an embodiment, control device 106 trims the buffered content such that a remaining buffered content can be presented in sync with content simultaneously presented by, for example, display device 102. In an embodiment, trimming the buffered content may refer to removing information from the buffer, adjusting a pointer to the buffer to logically remove information from the buffer, or any combination thereof. In an embodiment, the amount of trimmed buffered content corresponds to the underrun content amount.

At block 312, presentation of content from the buffer is resumed. In an embodiment, control device 106 resumes the presentation of buffered content, at which point control device 106 is no longer in an underrun state and the underrun time ends. For example, if the buffered content is audio, control device 106 can resume presentation of the audio from the buffer via headphones, internal, or external speakers of control device 106. Because of the timing of playback and condition of the buffer, the content is presented in sync with other content, such as, for example, video content being displayed by display device 102.

Figure 4:
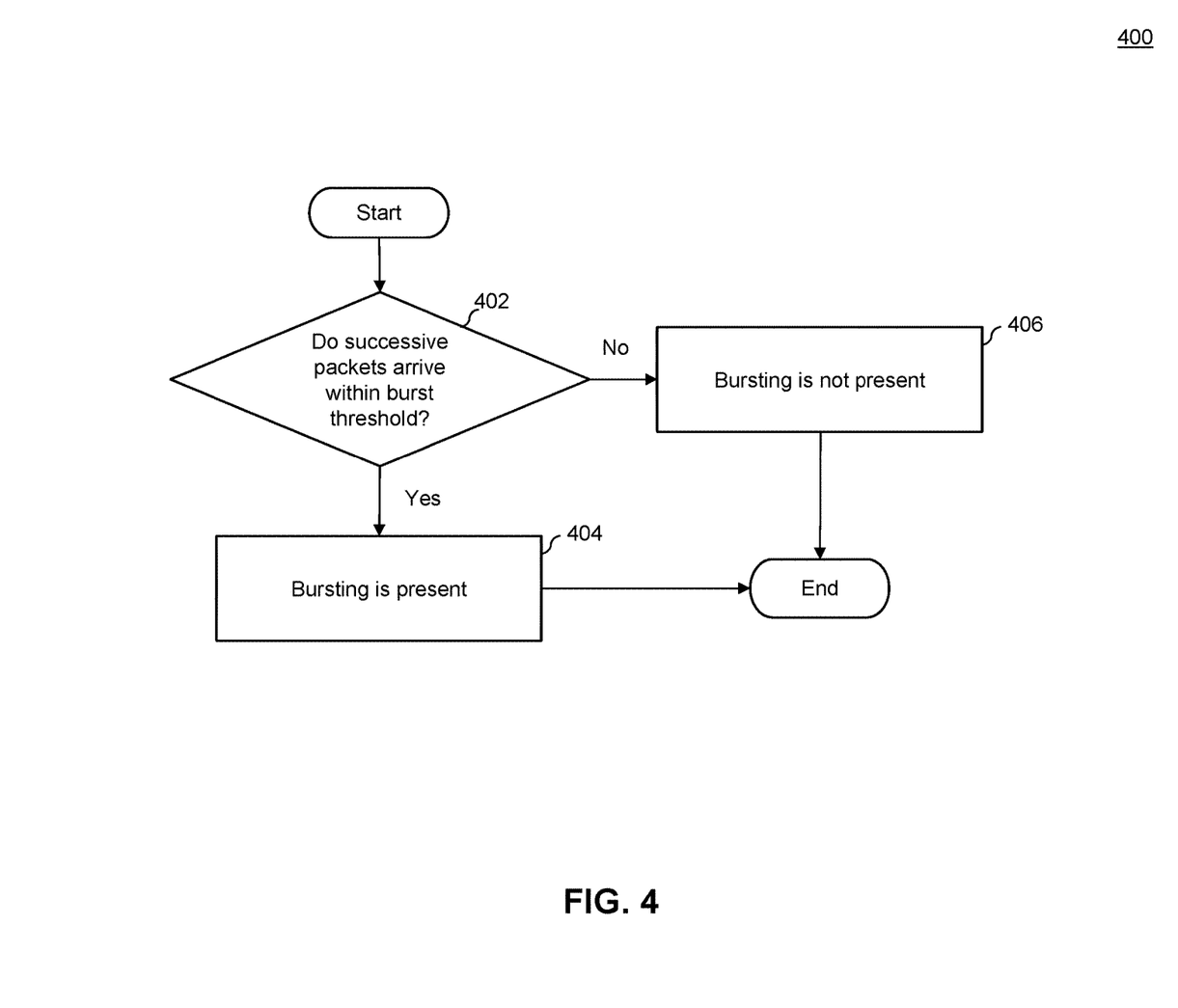
FIG. 4 illustrates a flowchart of an example method for detecting bursting in receiving a content stream, in accordance with one or more embodiments.

FIG. 4 is a flowchart of a method 400 for detecting bursting in a content stream and analogously, whether the network connection for transmitting the content stream is experiencing a burst condition, according to an embodiment. Method 400 can be performed by processing logic that can comprise hardware (e.g., circuitry, dedicated logic, programmable logic, microcode, etc.), software (e.g., instructions executing on a processing device), or a combination thereof. In an embodiment, method 400 is performed by control device 106, which can be implemented by a computer system such as computer system 700.

Method 400 starts and proceeds to block 402. At block 402, whether successive packets arrive within a burst threshold is determined. In an embodiment, control device 106 determines whether successive packets arrive from media device 104 within a burst threshold by calculating a time interval between successively received packets. For example, control device 106 may compare the time interval between two successively received packets with the burst threshold. Given a smooth transmission of packets, one expects packets to arrive at a consistent rate. This consistent rate may differ based on the content's sampling rate, the type of media, bit resolution of each sample, the size of each packet, or any combination thereof.

In an embodiment, a difference between a timestamp of a received packet and a timestamp of a packet received immediately prior to the received packet is compared to the burst threshold. The burst threshold corresponds to an expected time between successively received packets that indicates a consistent data flow. When values fall below the burst threshold—i.e. packets arrive more quickly than expected—bursting is determined to be present. For example, packets may be expected to arrive every 20 ms. A burst threshold can be set at 75% of 20 ms (15 ms). When control device 106 determines that the successive packets arrive within the burst threshold (e.g., the time between packet arrivals is less than the burst threshold), method 400 proceeds to block 404. Otherwise, when control device 106 determines that the time interval between successively received packets exceeds or matches the burst threshold, control device 106 determines that a bursting condition is not present. In this case, method 400 proceeds to block 406.

At block 404, a value indicating that bursting is present is returned. In an embodiment, control device 106 returns the value indicating that bursting is present.

At block 406, a value indicating that bursting is not present is returned. In an embodiment, control device 106 returns the value indicating that bursting is not present.

FIG. 5 is a flowchart for a method 500 for managing a target sync time, according to an embodiment. Method 500 can be performed by processing logic that can comprise hardware (e.g., circuitry, dedicated logic, programmable logic, microcode, etc.), software (e.g., instructions executing on a processing device), or a combination thereof. In an embodiment, method 500 is performed by control device 106, which can be implemented by a computer system such as computer system 700.

Method 500 starts and proceeds to block 502. At block 502, whether to increase a target sync time is determined. In an embodiment, control device 106 determines whether to increase a target sync time based on (i) a number of occurrences of buffer underruns within a predetermined period of time, and (ii) whether a time interval between successively received packet is greater than an upper limit value. For example, if the following conditions are met, control device 106 determines to increase the target sync time: (i) the number of occurrences of buffer underruns since setting the target sync time is two or more within a 30 second period, and (ii) the timestamp of a received packet minus the timestamp of the packet received immediately prior to the received packet is greater than an upper limit. In an embodiment, an initial target sync time value can be set to 500 ms minus HDMI delay (e.g. 130 ms) to be 370 ms. The upper limit can be set to 1500 ms. Although specific values for these parameters are given in the example above, it is understood that embodiments support any range of values for these parameters.

If control device 106 determines to increase the target sync time, method 500 proceeds to block 504. Otherwise, method 500 proceeds to block 506.

At block 504, the target sync time is adjusted upwards. In an embodiment, control device 106 increases the target sync time based on a comparison of the target sync time and the upper limit. For example, the target sync time can be adjusted to be the greater of (i) the target sync time plus an increment and (ii) the upper limit. For example, the increment may be 200 ms and the upper limit may be 1500 ms.

At block 506, the target sync time can be left as-is. Alternatively, the target sync time could be decreased, for example, by a decrement (such as 200 ms). In an embodiment, control device 106 sends, to media device 104, a message indicating the adjusted target sync time. As described with respect to FIG. 1, the message can be sent as one or more packets using RTCP.

Figure 6:
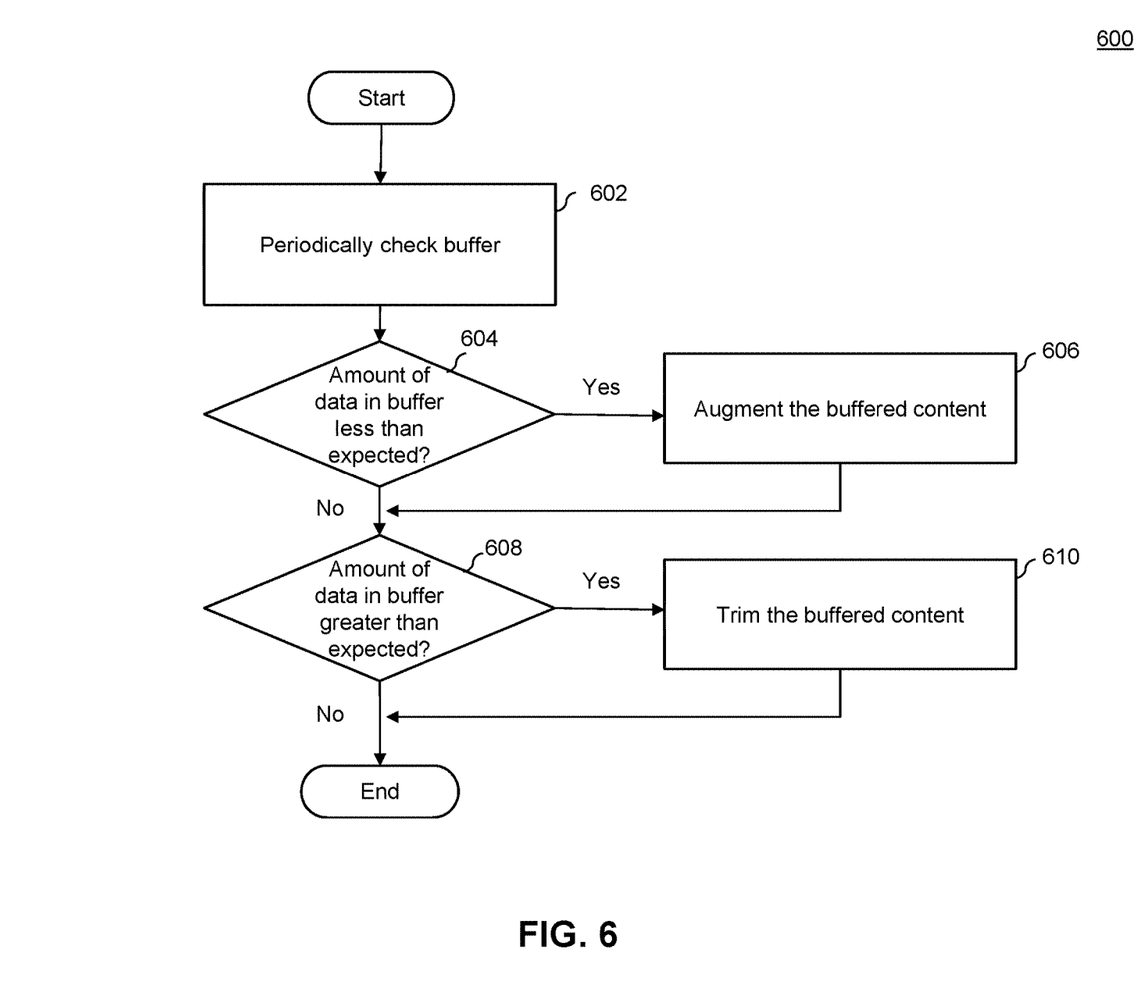
FIG. 6 illustrates a flowchart of an example method for managing a quality of service of streaming a media content stream, in accordance with one or more embodiments.

FIG. 6 is a flowchart for a method 600 for managing QoS of a media content stream, according to an embodiment. Method 600 can be used to control for clock skew between the clocks of media device 104 and control device 106. Method 600 can be performed by processing logic that can comprise hardware (e.g., circuitry, dedicated logic, programmable logic, microcode, etc.), software (e.g., instructions executing on a processing device), or a combination thereof. In an embodiment, method 600 is performed by control device 106, which can be implemented by a computer system such as computer system 700.

Method 600 starts and proceeds to block 602. At block 602, a content buffer is periodically checked for an amount of buffered content for streaming, e.g., presenting by a device. In an embodiment, control device 106 periodically checks the content buffer. For example, control device can check the buffer every 100 ms. The period of checking may be set to any interval.

At block 604, whether the amount of data in the buffer, i.e., buffered content, is less than an expected amount is determined. In an embodiment, control device 106 determines whether the amount of data in the buffer is less than an expected amount based on (i) the amount of data in the buffer, (ii) the target sync time, and (iii) a threshold based on a first delay time corresponding to the time period beginning when media device 104 transmits packets of the first portion of media content to display device 102 and ends when display device 102 presents the first portion of the media corresponding to the packets. In an embodiment, the buffered content is not less than the expected amount when the amount of buffered content is within a threshold value of a target-sync content amount, which represents the amount of buffered content needed to stream for the target sync time. For example, the amount of data in the buffer can be determined to be less than the expected amount when the amount of data in the buffer is less than the target-sync content amount minus the threshold value, e.g., a content amount capable of being streamed for half the first delay time. In an embodiment, control device 106 can determine whether the amount of buffered content is less than the expected amount using temporal metrics similar to the process described with respect to FIG. 3. If control device 106 determines that the amount of data in the buffer is less than expected, method 600 proceeds to block 606. Otherwise, method 600 proceeds to block 608.

At block 606, the buffered content is augmented. In an embodiment, control device 106 augments the buffered content. In an embodiment, augmenting the buffered content comprises adding enough information to the buffer such that the buffer contains an expected amount of buffered content. For example, the expected amount of buffered content may be within a threshold of a target-sync content amount. The added information can include, for example, duplicates of existing packets in the buffer, packets generated by a codec (such as the Opus codec) to interpose between existing packets in the buffer, or any combination thereof. In an embodiment, the amount by which to augment the buffered content can be a predetermined value. For example, the buffered content can be augmented with 20 ms of content. In this example, if necessary, the buffered content can be incrementally augmented on a periodic basis based on the periodic check as described with respect to step 602.

At block 608, whether the amount of data in the buffer, i.e., buffered content, is greater than another expected amount is determined. In an embodiment, control device 106 determines whether the amount of data in the buffer is greater than another expected amount based on (i) the amount of data in the buffer, (ii) the target sync time, and (iii) a threshold based on a first delay time corresponding to the time period beginning when media device 104 transmits packets of the first portion of media content to display device 102 and ends when display device 102 presents the first portion of the media corresponding to the packets. In an embodiment, the buffered content is not greater than another expected amount when the amount of buffered content is within a threshold value of a target-sync content amount, which represents the amount of buffered content needed to stream for the target sync time. For example, the amount of data in the buffer can be determined to be greater than another expected amount when the amount of data in the buffer is greater than the target-sync content amount plus the threshold value, e.g., a content amount capable of being streamed for the first delay time. In an embodiment, control device 106 can determine whether the amount of buffered content is greater than the another expected amount using temporal metrics similar to the process described with respect to FIG. 3. If control device 106 determines that the amount of data in the buffer is greater than expected, method 600 proceeds to block 610. Otherwise, method 600 ends.

At block 610, the buffered content is trimmed. In an embodiment, control device 106 trims the buffered content. In an embodiment, trimming the buffered content comprises removing information from the buffer, adjusting a pointer to the buffer to logically remove information from the buffer, or any combination thereof. In an embodiment, control device 106 trims, e.g., removing or adjusting a pointer, enough buffered content such that the buffer contains an expected amount of buffered content. In an embodiment For example, control device 106 can trim from the buffer an amount of data approximately equal to the amount of the buffered content available minus the target-sync content amount, which corresponds to the amount of buffered content to stream for the target sync time.

Therefore, FIG. 6 enables control device 106 to keep the amount of buffered content within its content buffer within an upper and lower threshold from the target-sync content amount. By dynamically adjusting, either by augmenting or trimming buffered content, control device 106 can present a portion of media content in sync with a corresponding portion of the media content presented by another device, such as display device 102.

EXAMPLE COMPUTER SYSTEM

Figure 7:
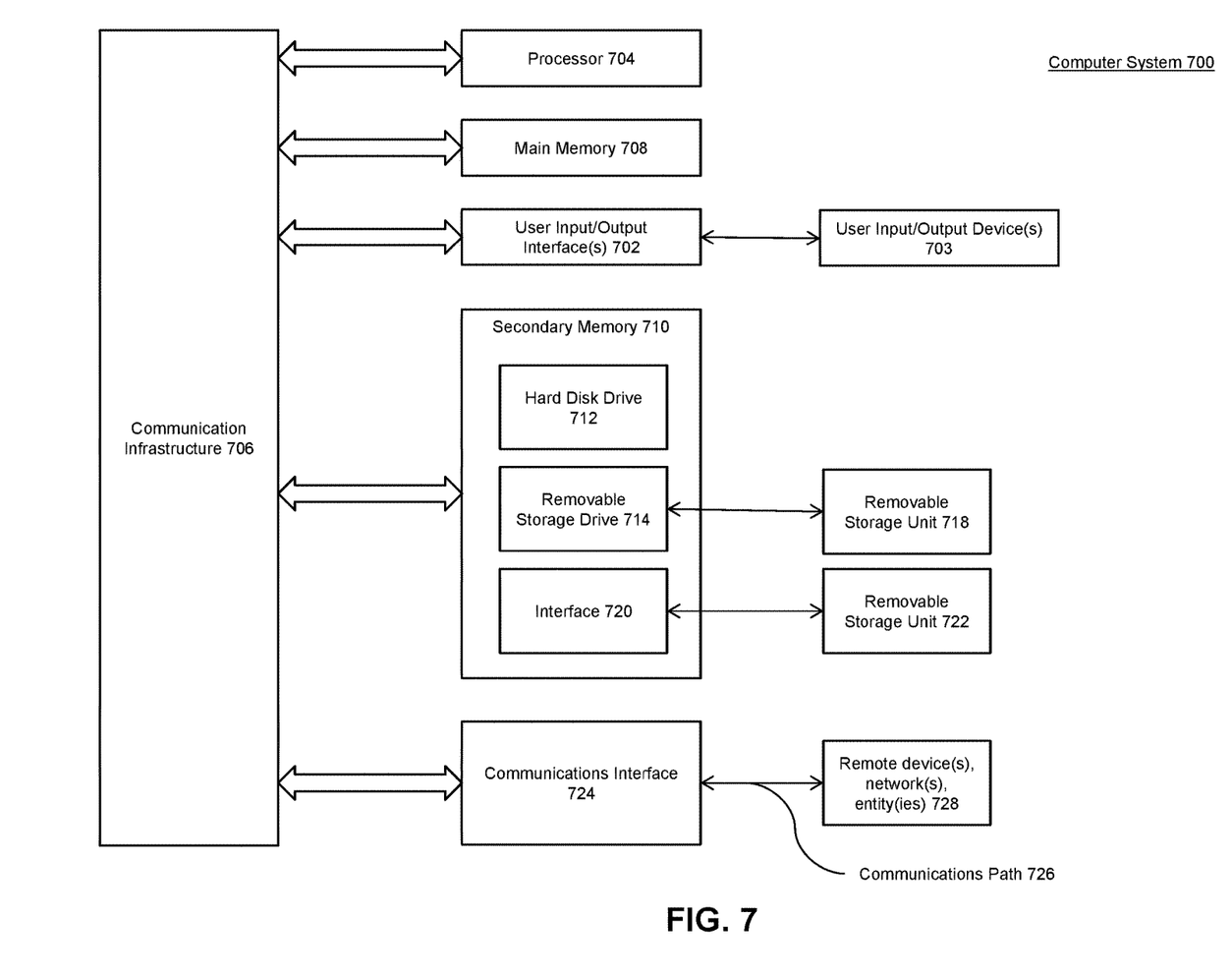
FIG. 7 illustrates an example computer system useful for implementing various embodiments.

Various embodiments and components therein such as, for example, display device 102, media device 104, control device 106, content server 112, and content datastore 114 shown in FIG. 1 can be implemented, for example, using one or more well-known computer systems. Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 can include one or more levels of cache. Main memory 708 has stored therein control logic (i.e., computer software) or data.

Computer system 700 can also include one or more secondary storage devices or memory 710. Secondary memory 710 can include, for example, a hard disk drive 712 or a removable storage device or drive 714. Removable storage drive 714 can be a floppy disk drive, a magnetic tape drive, a compact disk drive, an optical storage device, tape backup device, or any other storage device/drive.

Removable storage drive 714 can interact with a removable storage unit 718. Removable storage unit 718 includes a computer usable or readable storage device having stored thereon computer software (control logic) or data. Removable storage unit 718 can be a floppy disk, magnetic tape, compact disk, DVD, optical storage disk, and/any other computer data storage device. Removable storage drive 714 reads from or writes to removable storage unit 718 in a well-known manner.

According to an exemplary embodiment, secondary memory 710 can include other means, instrumentalities or other approaches for allowing computer programs or other instructions or data to be accessed by computer system 700. Such means, instrumentalities or other approaches can include, for example, a removable storage unit 722 and an interface 720. Examples of the removable storage unit 722 and the interface 720 can include a program cartridge and cartridge interface (such as that found in video game devices), a removable memory chip (such as an EPROM or PROM) and associated socket, a memory stick and USB port, a memory card and associated memory card slot, or any other removable storage unit and associated interface.

Computer system 700 can further include a communication or network interface 724. Communication interface 724 enables computer system 700 to communicate and interact with any combination of remote devices, remote networks, remote entities, etc. (individually and collectively referenced by reference number 728). For example, communication interface 724 can allow computer system 700 to communicate with remote devices 728 over communications path 726, which can be wired or wireless, and which can include any combination of LANs, WANs, the Internet, etc. Control logic or data can be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data-processing devices (such as computer system 700), causes such data-processing devices to operate as described herein.

Based on the teachings contained in this disclosure, it will be apparent to persons skilled in the relevant art(s) how to make and use embodiments of the invention using data-processing devices, computer systems or computer architectures other than that shown in FIG. 7. In particular, embodiments can operate with software, hardware, or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments of the invention as contemplated by the inventors, and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, or entities illustrated in the figures or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" or "coupled" to indicate that two or more elements are in direct physical or electrical contact with each other. The term "coupled," however, can also mean that two or more elements are not in direct contact with each other, but yet still co-operate or interact with each other.

The breadth and scope of the invention should not be limited by any of the above-described exemplary embodiments, but should be defined only in accordance with the following claims and their equivalents.

What is claimed is:

1. A media device comprising:
a memory; and
at least one processor coupled to the memory, the at least one processor configured to:
separate media content into at least a first portion and a second portion;
determine a first streaming delay time and a second streaming delay time based on a target sync time, wherein the first streaming delay time includes a first incremental buffer time, and wherein the second streaming delay time includes a second incremental buffer time;
detect a change in the target sync time;
modify the first streaming delay time and the second streaming delay time based on the change to generate a first modified delay time and a second modified delay time;
stream the first portion to a display device with the first modified delay time;
stream the second portion to a control device with the second modified delay time;
determine that a plurality of buffer underruns have occurred at a buffer of the control device during a specified time interval; and
increase the first modified delay time and the target sync time responsive to the determination that the plurality of buffer underruns have occurred at the buffer of the control device during the specified time interval, wherein the first portion is streamed based on the increased first modified delay time subsequent to the determination that the plurality of buffer underruns have occurred at the buffer on the control device.

2. The media device of claim 1, wherein the first portion is video content and the second portion is audio content.

3. The media device of claim 1, wherein the at least one processor is further configured to:
detect a ceasing of communication with the control device;
in response to the detecting, halt streaming of the second portion to the control device; and
stream the second portion to the display device.

4. The media device of claim 1, wherein the first streaming delay time is determined based on a first communication link between the media device and the display device, and wherein the second streaming delay time is determined based on a second communication link between the media device and the display device.

5. The media device of claim 4, wherein the first streaming delay time is smaller than the second streaming delay time.

6. The media device of claim 1, wherein the first streaming delay time is determined based on an actual delay time, an average delay time, or an expected delay time.

7. The media device of claim 1, wherein the at least one processor is further configured to:
determine that a status message was not received; and
halt a stream of content to the buffer responsive to the determination that the status message was not received.

8. A computer-implemented method comprising:
separating media content into at least a first portion and a second portion;
determining a first streaming delay time and a second streaming delay time based on a target sync time, wherein the first streaming delay time includes a first incremental buffer time, and wherein the second streaming delay time includes a second incremental buffer time;
detecting a change in the target sync time;
modifying the first streaming delay time and the second streaming delay time based on the change to generate a first modified delay time and a second modified delay time;
streaming the first portion to a display device with the first modified delay time;
streaming the second portion to a control device with the second modified delay time;
determining that a plurality of buffer underruns have occurred at a buffer of the control device during a specified time interval; and
increasing the first modified delay time and the target sync time responsive to the determination that the plurality of buffer underruns have occurred at the buffer of the control device during the specified time interval, wherein the first portion is streamed based on the increased first modified delay time subsequent to the determination that the plurality of buffer underruns have occurred at the buffer on the control device.

9. The computer-implemented method of claim 8, wherein the first portion is video content and the second portion is audio content.

10. The computer-implemented method of claim 8, further comprising:
detecting a ceasing of communication with the control device;
in response to the detecting, halting streaming of the second portion to the control device; and
streaming the second portion to the display device.

11. The computer-implemented method of claim 8, wherein the first streaming delay time is determined based on a first communication link between a media device and the display device, and wherein the second streaming delay time is determined based on a second communication link between the media device and the display device.

12. The computer-implemented method of claim 11, wherein the first streaming delay time is smaller than the second streaming delay time.

13. The computer-implemented method of claim 8, wherein the first streaming delay time is determined based on an actual delay time, an average delay time, or an expected delay time.

14. A non-transitory computer-readable medium having instructions stored thereon that, when executed by at least one computing device, cause the at least one computing device to perform operations comprising:
separating media content into at least a first portion and a second portion;
determining a first streaming delay time and a second streaming delay time based on a target sync time, wherein the first streaming delay time includes a first incremental buffer time, and wherein the second streaming delay time includes a second incremental buffer time;
detecting a change in the target sync time;
modifying the first streaming delay time and the second streaming delay time based on the change to generate a first modified delay time and a second modified delay time;
streaming the first portion to a display device with the first modified delay time;
streaming the second portion to a control device with the second modified delay time;
determining that a plurality of buffer underruns have occurred at a buffer of the control device during a specified time interval; and
increasing the first modified delay time and the target sync time responsive to the determination that the plurality of buffer underruns have occurred at the buffer of the control device during the specified time interval, wherein the first portion is streamed based on the increased first modified delay time subsequent to the determination that the plurality of buffer underruns have occurred at the buffer on the control device.

15. The non-transitory computer-readable medium of claim 14, wherein the first portion is video content and the second portion is audio content.

16. The non-transitory computer-readable medium of claim 14, the operations further comprising:
detecting a ceasing of communication with the control device;
in response to the detecting, halting streaming of the second portion to the control device; and
streaming the second portion to the display device.

17. The non-transitory computer-readable medium of claim 14, wherein the first streaming delay time is determined based on a first communication link between a media device and the display device, and wherein the second streaming delay time is determined based on a second communication link between the media device and the display device.

18. The non-transitory computer-readable medium of claim 17, wherein the first streaming delay time is smaller than the second streaming delay time.

19. A computer-implemented method comprising:
separating media content into at least a first portion and a second portion;
determining a first streaming delay time and a second streaming delay time based on a target sync time;
detecting a change in the target sync time;
modifying the first streaming delay time and the second streaming delay time based on the change to generate a first modified delay time and a second modified delay time;
streaming the first portion to a display device with the first modified delay time;
streaming the second portion to a control device with the second modified delay time;
detecting a ceasing of communication with the control device;
in response to the detecting, halting streaming of the second portion to the control device;
streaming the second portion to the display device;
determining that a plurality of buffer underruns have occurred at a buffer of the control device during a specified time interval; and
increasing the first modified delay time and the target sync time responsive to the determination that the plurality of buffer underruns have occurred at the buffer of the control device during the specified time interval, wherein the first portion is streamed based on the increased first modified delay time subsequent to the determination that the plurality of buffer underruns have occurred at the buffer on the control device.

20. A computer-implemented method comprising:
separating media content into at least a first portion and a second portion;
determining a first streaming delay time and a second streaming delay time based on a target sync time;
detecting a change in the target sync time;
modifying the first streaming delay time and the second streaming delay time based on the change to generate a first modified delay time and a second modified delay time;
streaming the first portion to a display device with the first modified delay time;
streaming the second portion to a control device with the second modified delay time;
determining that a plurality of buffer underruns have occurred at a buffer of the control device during a specified time interval;
increasing the first modified delay time and the target sync time responsive to the determination that the plurality of buffer underruns have occurred at a buffer of the control device during the specified time interval, wherein the first portion is streamed based on the increased first modified delay time subsequent to the determination that the plurality of buffer underruns have occurred at the buffer on the control device;
determining that a status message was not received; and
halting a stream of content to the buffer responsive to the determination that the status message was not received.

* * * * *